United States Patent Office 3,086,839
Patented Apr. 23, 1963

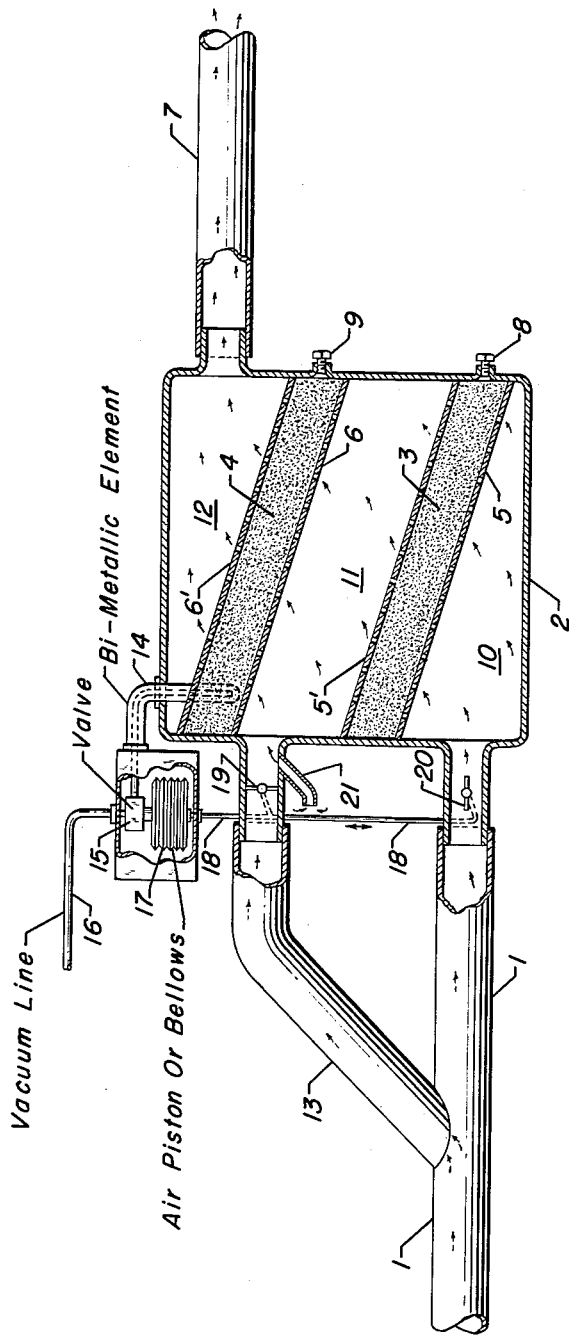
INVENTOR:
Herman S. Bloch

3,086,839
METHOD FOR MULTIPLE ZONE TREATING
OF WASTE GAS STREAMS
Herman S. Bloch, Skokie, Ill., assignor to Universal Oil Products Company, Des Plaines, Ill., a corporation of Delaware
Filed Mar. 30, 1960, Ser. No. 18,744
6 Claims. (Cl. 23—2)

This invention relates to the treatment of waste products in a multiple zone system in a manner which renders them less objectionable for discharge to the atmosphere.

Waste products from various sources are discharged into the atmosphere and unless the waste products are treated to remove deleterious components, the waste products may contaminate the atmosphere. A specific example is the case of exhaust products from automotive engines. Such waste products contain one or more components such as unburned hydrocarbon, carbon monoxide, nitrogen oxides, sulfur compounds, partially oxidized products, etc. in various concentrations, and part or all of these are believed to contribute to the smog problem presently facing various geographical areas of the United States and other countries. It is believed that these combustion products react with oxygen under the innfluence of sunlight to produce smog. With the growing number of automobiles, particularly in urban areas, the discharge of such waste products into the atmosphere will further increase and aggravate the problem.

The discharge of exhaust from automotive engines is only one source of pollution in the atmosphere. Other examples of the discharge of waste products into the atmosphere include those emitting from stationary engines, the fumes exhausted from various industrial operations as, for example, the printing industry, the tanning industry, various chemical plants, etc. For example, in the printing industry, inks, dyes, etc. contain hydrocarbons and other chemical compounds which, either in the same or modified form, accumulate in the surroundings and are vented by means of blowers and the like into the atmosphere. Regardless of the source of the waste products, the present invention provides an improved method for treating these waste products to decrease the deleterious effect which otherwise may be encountered by discharging the waste products directly into the atmosphere.

Methods for converting vehicular exhaust gases to less harmful materials, such as carbon dioxide and water vapor, may be either catalytic or thermal conversions. In the catalytic method, the exhaust gases are passed into contact with a suitable conversion catalyst prior to discharge into the atmosphere. In the thermal method, the exhaust gases are heated to, or are maintained at, a sufficiently high temperature, in the presence of oxygen to burn without utilization of a catalyst. With either method it is necessary to provide a stoichiometric amount, or preferably an excess amount of oxygen or air in the exhaust gas stream.

It is a principal object of the present invention to provide an operation whereby catalyst is used to a minimum extent in order to obviate the necessity of frequent changes of catalyst in the conversion zone.

It is a further object of the present invention to provide an improved means for combining catalytic and non-catalytic conversion means in a multiple zone system to effect the oxidation and treatment of waste products for discharge to the atmosphere, in a manner such that the catalyst zone undergoes minimum exposure to the waste products stream.

In connection with automotive exhaust gases, it has been found that many of the desirable catalysts for effecting the oxidation and treatment of the waste products stream for improving it prior to discharge to the atmosphere are harmfully affected by lead or lead compounds. Where tetraethyl lead has been added to the gasoline which is used in the operation of an auto engine and the resulting exhaust products are treated by an oxidation catalyst it has been generally found that such catalysts have a shorter active life than is desired by reason of the continued exposure to the lead compounds in the waste products stream. Similarly, other compounds from waste industrial gases, other than auto or engine exhaust streams, may exert a poisoning effect on a catalyst bed and it is an advantage to provide a system whereby the catalytic material be used only to initiate oxidation and treatment of the waste products stream. Afterburners and other thermal oxidation apparatus generally have disadvantages and operational problems when subjected to intermittent use, as in use with automobile engines, in that they must be brought up to a desired high oxidizing temperature in order that they may operate efficiently and sustain oxidation of the waste products stream in a thermal or non-catalytic manner.

It is thus a still further object of the present invention to combine a catalytic conversion zone with at least one other zone, which may be non-catalytic in operation, whereby some oxidation is initiated in a first catalytic zone and maintained therein until a temperature level is reached in an adjacent non-catalytic zone whereby thermal conversion may be carried out to complete the oxidation and treatment of the waste products stream prior to its discharge to the atmosphere.

Still other objects and advantages of the present multiple zone system will be brought out in connection with the hereinafter set forth embodiments and description of the invention.

In a broad aspect, the present invention provides a method for treating a waste products stream in a multiple zone system, which comprises, passing the stream into contact with an oxidizing catalyst in a first conversion zone and effecting at least a partial conversion thereof, subsequently passing a resulting contacted and heated products stream into at least one additional contacting zone and effecting further conversion thereof to provide oxidized and less objectionable products suitable for discharge to the atmosphere.

In a more specific embodiment of the present invention, there is provided a method for treating a waste products stream in a multiple zone system, which comprises, passing the stream through a first conversion zone and contacting an oxidation catalyst therein at conditions providing a partial oxidation and conversion of this stream, passing the resulting heated and partially oxidized waste products stream from the first zone to a second zone, further oxidizing and converting the products stream in the latter zone to provide oxidized and less objectionable products in the presence of a temperature resistant, substantially inert, packing material, and by-passing the products stream flow around the first contacting zone upon reaching a temperature level sufficient to maintain thermal conversion in the second conversion zone, whereby the oxidizing catalyst in the first zone is subjected to intermittent use only.

Various embodiments of the invention may provide automatic actuating means for effecting by-pass flow of the waste products stream directly to the thermal conversion zone upon the latter reaching the desired operating temperature level. For example, a thermocouple or other temperature sensitive means in the bed of the second conversion zone may connect through suitable "motor" means, which may comprise air power or electrically powered devices, to effect the movement of suitable valving means in the exhaust conduits such that the waste stream is shunted from the first conversion zone to the non-catalytic zone. In one apparatus embodiment, a bi-metallic strip may be utilized in connection with the thermal conversion zone to act upon a valving means in an air line, or in a vacuum line connected with an engine intake-manifold, to actuate an air piston or bellows which will in turn move valving means within the exhaust gas or waste products stream conduits to effect the shunting of the waste products stream from the first or catalytic conversion zone directly to the second or thermal conversion zone.

The present invention may be more clearly understood and explained in connection with the accompanying diagrammatic drawing which indicates apparatus adapted to embody the processing flow through a multiple bed system to effect an efficient treating operation.

Referring now to the drawing, there is indicated a waste products conduit 1 connecting with a chamber 2 which, in turn, is provided with two separate zones or beds of contact material indicated respectively as 3 and 4. The bed 3 comprises pellets or other subdivided particles of catalyst which is maintained in position between perforate plates 5 and 5'. Bed 4 comprises subdivided particles of material which may be catalytic in nature but preferably may comprise heat resistant inert particles of the nature of Carborundum, magnesite, silicon carbide, alumina, porcelain, and the like, such material being held in place between perforate plates 6 and 6'. Treated waste products may be discharged from the chamber 2 by way of outlet conduit 7, which, in connection with an automobile muffler or converter, would comprise a "tailpipe."

In the illustrated embodiment, the perforated plates 5 and 5', as well as plates 6 and 6', are placed diagonally across the chamber and are suitably spaced to provide substantially uniform flow across their entire widths or exposed areas, and in turn to provide for substantially uniform flow through the depths of the packed beds 3 and 4. In a preferred apparatus arrangement, suitable removable plugs 8 and 9 may be placed through the walls of the chamber 2 and connect, respectively, with packed beds 3 and 4, whereby the particles therein may be withdrawn and replaced when it is so desired.

The inlet conduit 1 connects with the lower inlet section 10 such that it will be seen that the stream to be treated passes serially through bed 3 and into a redistributing zone or section 11 and then through bed 4 to a discharge section 12 which in turn communicates through its outlet port to the conduit or tailpipe 7 for discharge to the atmosphere. However, in accordance with the preferred method of operation, inlet ports and conduit means are provided in connection with chamber 2 whereby the waste products stream to conduit 1 may be by-passed around the inlet section 10 and the initial catalytic conversion zone 3, whereby all of the stream may be passed directly to the conversion bed 4 and then subsequently discharged from the chamber. Such an operation, as hereinbefore set forth, obtains a limited use of the catalyst bed 3 whereby the latter may have a longer life or activity, particularly where it may be exposed to a waste products stream having deactivating components as a part of such stream.

It is also a concept and an important aspect of the present invention to provide a method of operation which obtains thermal or non-catalytic conversion within the zone of bed 4 such that the material therein may have a long life, without the need of change of particles in such zone because of deactivation. The multiple zone or combined bed system is of particular advantage, however, in that it provides means for initiating conversion of the waste products stream in a first zone, as provided by bed 3, with resulting high temperature oxidation products and a heated waste stream which is subsequently charged to conversion bed 4, in turn permitting the latter to effect completion of the oxidation and conversion of the waste products to less harmful materials. In the case of automotive exhaust gases, self-sustaining thermal conversion may usually be carried out at temperatures of the order of 1150° F. to 1250° F., and higher, so that after the multiple stage operation is carried out to effect suitable temperature levels with completed oxidation and conversion taking place in the zone of bed 4, the flow through bed 3 may be then discontinued and passed directly to bed 4.

The present embodiment provides a conduit 13 connecting directly to an inlet port for the intermediate zone 11 so that when flow in conduit 1 is blocked at the chamber 2, all of the waste stream will pass through the pipe or conduit 13. As hereinbefore set forth, various mechanical and "motor" means may be provided for effecting the switch in flow from pipe 1 to pipe 13 and it is not intended to limit the present invention to any one arrangement or set of components providing for the valving or switching of flow between conduits and to the intermediate portion of the chamber 2. There is illustrated a bi-metallic element 14 which communicates with the interior of the particle bed 4, whereby it is acted upon by temperature changes within this bed. The bi-metallic element 14 in turn connects with and operates a valve 15 in a vacuum line 16 such that the effect of the vacuum in this line will, in turn, operate a piston or bellows 17, the latter being connected with a movable rod or arm 18 which in turn connects with valves 19 and 20, placed respectively within conduits 13 and 1. The valves 19 and 20 are indicated diagrammatically as "butterfly-type" valves which may be operated through 90° to effect either full opening or full closing positions. It should, of course, be noted that the valves 19 and 20 are installed at 90° to one another such that when one is open the other is closed, whereby the stream flow may be alternately shunted from one conduit to the other and from one zone in the conversion chamber to the other. An auxiliary air inlet port 21 is also provided at the inlet port to the intermediate zone 11 whereby an auxiliary air supply may be provided for effecting a complete oxidative conversion within the zone of bed 4. The drawing does not indicate means for introducing auxiliary air or oxygen into pipe 1 or into bed 3, however, in some instances it may be desirable to inject air into the inlet ahead of bed 3 to effect better or more efficient burning in this first zone.

With respect to the apparatus arrangement itself, it is obvious that various modifications may be made as, for example, the retaining plates 5, 5', 6 and 6' may comprise woven wire screening, rather than perforated plates and they may be positioned in different manners within the chamber 2, other than the particular sloping arrangement which has been indicated. The side walls and the internal portions of the chamber are, however, preferably made of light gauge sheet metal, which may comprise any of the various stainless steels, the selection being dependent upon temperatures encountered within the chamber. A preferable embodiment will normally make use of a heat resistant alloy comprising one of the stainless steels for the perforate members 6 and 6' where the high temperature thermal conversion is carried out.

The exterior of the converter chamber 2 may be covered in whole or in part with a layer of insulation such as mineral wool or asbestos. The insulation serves to maintain heat within the conversion zones, thereby attaining rapid activation of the desired oxidation reactions to be carried out within the chamber, as well as serving to protect adjacent floor boards or other automotive parts, in connection with motor vehicles. However, where the present flow system is utilized in connection with industrial waste products and in combination with stack arrangements, rather than with engine exhaust pipes, protective insulation may be required to the same extent that it is required with the motor vehicle. Means may also be provided to pass the hot exhaust gases from the outlet port or pipe 7 to a heat exchange chamber maintained around section 11 and the conversion bed 4.

Various types of suitable oxidation catalysts may be utilized within the bed 3, by way of illustration, oxides of the metals of sub-groups I, V, VI and VIII of the periodic table, and particularly chromium, iron, cobalt, nickel, platinum, copper, silver and vanadium oxides provide desired active components. These components may be used singly or in combination with one or more other components, and may be composited with an inorganic refractory oxide such as alumina, silica-alumina, silica-alumina-zirconia, silica-thoria, silica-boria and the like. The physical shape of the catalyst may be in the form of spheres, cylinders, cubes, pellets or the like and preferably these particles will have a small dimension of the order of $1/32''$ to $1/8''$ in diameter or in its major dimension. In loading the catalyst within the packed zones of the chamber, care should be taken to insure that the catalyst particles are uniformly packed and distributed in all portions of the bed in order to have a resulting bed with a uniform resistance to flow.

With respect to the inert particles within bed 4, such particles should likewise be uniformly placed and distributed throughout the zone of bed 4 such that there is a resulting bed having a uniform resistance to flow, thus precluding channeling and by-passing within small sections of the bed. In some instances, it may be desirable to utilize a catalytic material within the zone of bed 4 rather than a strictly inert or non-catalytic material. Alternatively, it may be desirable to place deactivated or used catalyst particles within this bed by reason of their availability and by reason of the desired switching operation, which does not depend upon a highly active material within the second zone of the system.

In the multiple system operation, making use of multiple contacting zones, the waste products flow into the inlet zone 10 and are distributed through bed 3 whereby they are at least partially oxidized therein. In the case of automotive exhaust, a substantial portion of the carbon monoxide in the stream may be converted to carbon dioxide and at least a portion of the nitrogen oxides may be reduced or converted to less objectionable forms by reason of a reduction treatment obtained therein. The resulting oxidation products and resulting heated unconverted portion of the stream is then passed through the distributing zone 11 to the oxidation zone bed 4 to undergo further oxidation and treatment therein prior to discharge through the outlet zone 12 and outlet pipe 7. Here again, in connection with automotive exhaust gas streams, the flow through bed 3 is maintained until such time as the temperature within bed 4 attains the level of about 1150° F. to 1250° F. or higher whereby a sustained thermal oxidation conversion may be carried out. Subsequently, as this level is reached, the auxiliary apparatus and valving arrangement connecting with valves 19 and 20 work through the temperature sensitive element 14 to effect the closing of valve 20 and the opening of valve 19 whereby all of the exhaust gas stream passes through line 13 directly to the distributing zone 11 and bed 4, and thus undergoes conversion in the latter zone. This flow continues until such time in the operation as the temperature falls below that called for by the element 14 and as required to sustain thermal conversion, in which case the valving arrangement is reversed to again bring into operation the multiple bed flow embodying the use of bed 3, all of which provides a desirable multiple bed arrangement with switching means utilizing a conversion initiating bed or an active catalyst bed only when it is actually needed in the conversion system.

In an alternative arrangement providing a desirable operation, valves 19 and 20 may be disposed at such an angle to each other that when valve 19 is open valve 20 is partly open, while when valve 19 is closed valve 20 is fully open. In this manner, when a temperature has been reached in bed 4 sufficiently high for a self-sustaining thermal combustion, the bulk of the gases passes through bed 4 while a minor portion still passes through bed 3 and thence bed 4, thereby serving to maintain a high temperature in bed 4 and prolong the period during which bed 3 does not sustain the entire gas flow.

I claim as my invention:

1. In the discharge to the atmosphere of a waste gas stream containing oxidizable gaseous compounds, the method which comprises passing said stream through a bed of solid oxidizing catalyst and therein burning at least a portion of said oxidizable compounds, thereby generating heat, passing the resultant hot combustion products through a second bed of relatively inert solid material to heat the latter, continuing the passage of the waste gas stream through the catalyst bed and the passage of hot combustion products from the catalyst bed through said second bed until the second bed has been heated by the combustion products to a temperature sufficient to sustain non-catalytic combustion of said oxidizable compounds, then discontinuing the passage of the waste gas stream through said catalyst bed and introducing the same, without substantial heating thereof, to said second bed, passing the thus diverted waste gas stream through the second bed and therein burning oxidizable components thereof by the heat imparted to said second bed from said hot combustion products and without the application of extraneous heat to the diverted gas stream, the flow of the waste gas stream being diverted from the catalyst bed to said second bed and from the second bed to the catalyst bed in response to temperature variations in the second bed.

2. The method of claim 1 further characterized in that said waste gas stream comprises lead-containing exhaust gases of an internal combustion engine.

3. The method of claim 1 further characterized in that air is added to the waste gas stream supplied to said second bed.

4. The method of claim 1 further characterized in that air is added to the waste gas stream supplied to the catalyst bed.

5. The method of claim 1 further characterized in that hot combustion products are passed from the catalyst bed through said second bed until the latter has attained a temperature of at least 1150° F.

6. In the discharge to the atmosphere of a waste gas stream containing oxidizable gaseous compounds, the method which comprises passing said stream through a catalytic oxidizing zone containing a bed of solid oxidizing catalyst and therein burning at least a portion of said oxidizable compounds, thereby generating heat, passing the resultant hot combustion products through a non-catalytic oxidizing zone to heat the latter, continuing the passage of the waste gas stream through said catalytic zone and the passage of hot combustion products from this zone through said non-catalytic zone until the latter zone has been heated by the combustion products to a temperature sufficient to sustain non-catalytic combustion of said oxidizable compounds, then discontinuing the passage of the waste gas stream through said catalytic zone and introducing the same, without substantial heating thereof, to said non-catalytic zone, passing the thus diverted waste gas stream through the non-catalytic zone and therein burning oxidizable components thereof by the heat imparted to said non-catalytic zone from said hot combustion products and without the application of extraneous heat to the diverted gas stream, the flow of the waste gas stream being diverted from the catalytic zone to the non-catalytic zone and from the non-catalytic zone to the catalytic zone in response to temperature variations in the non-catalytic zone.

References Cited in the file of this patent

UNITED STATES PATENTS

| | | |
|---|---|---|
| 2,905,523 | Houdry et al. | Sept. 22, 1959 |
| 2,930,184 | Plescia et al. | Mar. 29, 1960 |
| 2,991,160 | Claussen | July 4, 1961 |